July 31, 1962
J. P. AU WERTER
3,046,785
GUARD FOR SIGHT GAUGE GLASS AND
METHOD OF MAKING SAME
Filed April 7, 1958
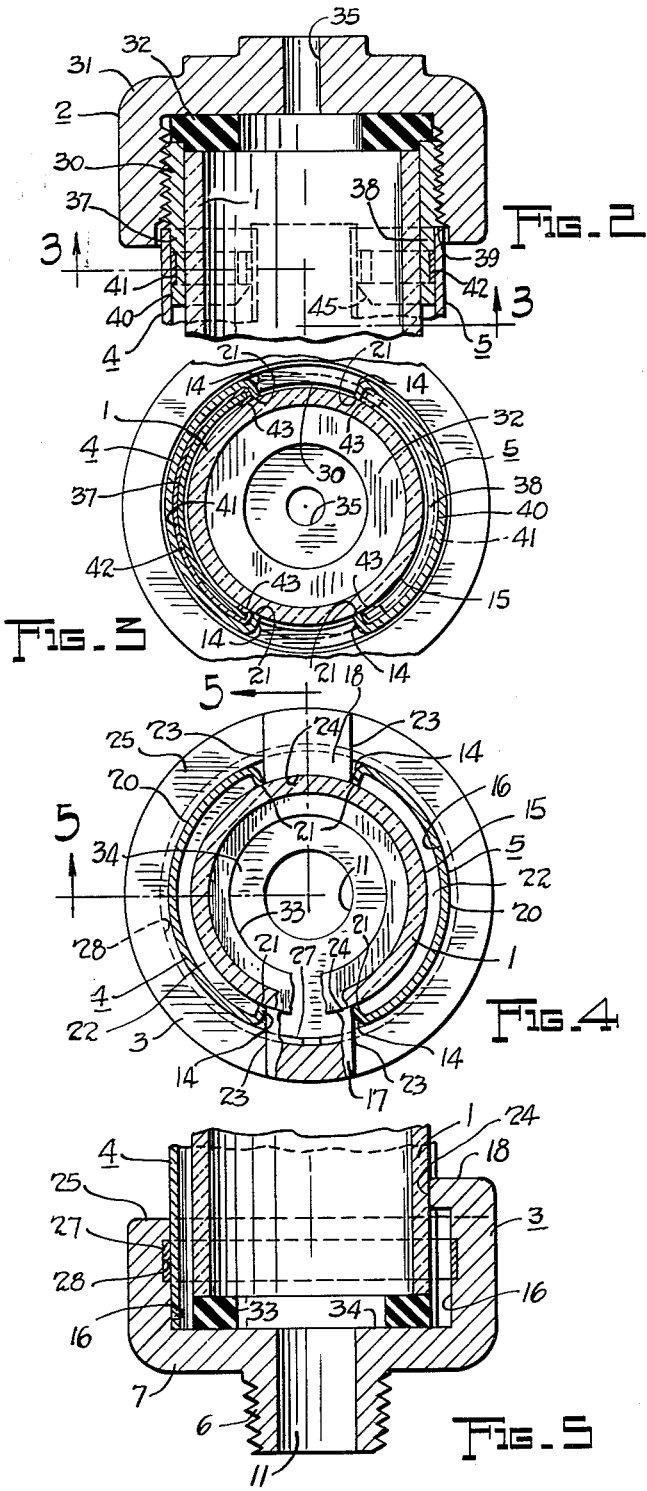
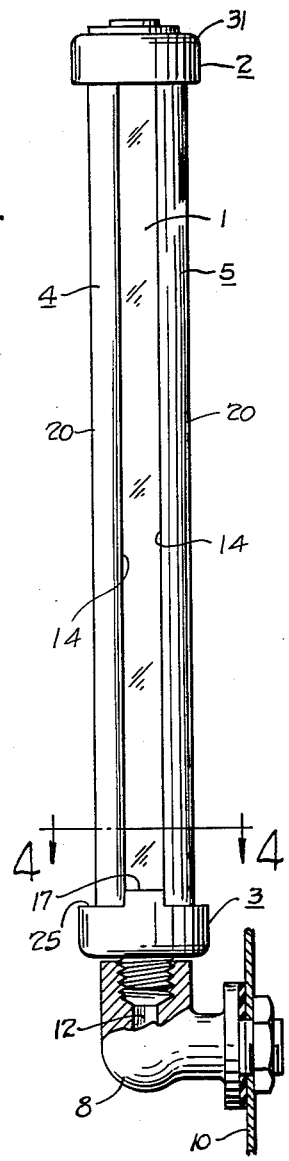
INVENTOR.
Jay P. Au Werter
BY Bosworth, Sessions,
Herrstrom and Knowles
ATTORNEYS

3,046,785
GUARD FOR SIGHT GAUGE GLASS AND METHOD OF MAKING SAME
Jay P. Au Werter, 23276 Laureldale Road, Cleveland, Ohio
Filed Apr. 7, 1958, Ser. No. 726,870
7 Claims. (Cl. 73—325)

This invention relates to gauge devices for indicating the levels of liquids in containers, more particularly to protective holders and guards for the tubular sight glasses used in such gauges and a method of making the end members of such gauges.

Tubular sight glasses are commonly used to indicate liquid levels in water tanks, boilers and culinary vessels such as those used as coffee and tea makers and in heating water for general cooking purposes. The practical need for adequate protection of the fragile sight glass has long been recognized and numerous devices have been provided to surround or enclose the glass tube with protective shields or guards. In the case of a gauge glass for use on a beverage making or food cooking vessel it is of prime importance that the device be so designed and constructed as to promote a high degree of sanitation in its use. Not only must the sight gauge assembly be free of dirt collecting cracks, corners and crevices, but it must be capable of easy disassembly and reassembly for cleaning of the internal passages and the inside of the tubular sight glass. It is therefore an object of the invention to provide a sight glass assembly possessing the desirable characteristics mentioned.

Certain types of liquid level gauges are open topped; that is, the sight glass tube is connected only at its bottom end to the vessel containing the liquid, the upper end of the glass tube standing free, with the upper end of the glass tube vented or open to the atmosphere. In a gauge of this free standing or vented, open ended type, the sole connection between the vessel and the gauge is at the lower end of the latter and considerable strength and rigidity is required in the guard assembly to resist blows and strains tending to deflect the upper or free end of the device. Moreover, the shield or guard elements that partially enclose the sight glass tube must be so connected to the end members of the guard assembly as to withstand tensile forces resulting from the application of an axial load on the glass tube for the purpose of compressing a sealing washer between the lower end of such tube and the bottom end member of the gauge assembly. Thus, another object of the invention is to provide an improved gauge glass assembly of the free standing type referred to in which the glass tube is protected by one or more shield members, preferably of thin metal, fast to spaced end members, the assembly being adapted to maintain an end load on the glass tube and to withstand lateral forces tending to bend the assembly. More specifically, it is sought to provide a sight glass guard of such type in which the ends of the shield members and the spaced end members are so formed as to interfit one within the other in axially slidable relation in assembly, automatically to locate the parts in predetermined positions about the longitudinal axis of the device, and in which the interfitted portions of the shield and end members have surface areas in contact with one another ample for easy securement by conventional bonding techniques.

Another object is to provide a guard for a cylindrically surfaced sight glass in which the latter is shielded by one or more arcuately curved thin metal members generally paralleling the tube and having narrow edge flanges turned inwardly to make substantially line contact engagement with the cylindrical surface of the glass tube. According to a specialized version of the invention, the thin metal shield members are of uniform cross section and comprise body portions arcuately curved in concentric relation to the cylindrical surface of the glass tube to be protected thereby, the edge flanges constituting spacers which hold the curved body portions of the shields away from the glass tube.

A still further object is directed to the provision in such a sight gauge of the combination of an end member and a shield member in which the end member takes the form of a cup adapted to receive one end of the shield member, the cup being formed with inwardly directed projections, preferably in the form of segmental flange means, which projections provide circumferentially spaced shoulders at the rim of the cup for locatingly engaging the edges of the shield member. As a refinement of the invention and as another of its objectives, the inward projections or flanges of the cup shaped end member referred to are located axially beyond or above the other portion or portions of the cup rim in the elimination of dirt catching cavities in the assembly, projections or such flanges preferably having arcuately curved inner edges for engagement with the cylindrical surface of the sight glass to center the latter in the cup.

Another objective of the invention is the provision of a guard assembly for such a sight glass in which one of the end members comprises a ring formed with circumferentially spaced axially extending segmental elements receivable against and adapted to be bonded to the inside surfaces of the shield members. According to a refinement of this aspect of the invention, the segmental elements have spaced parallel axially extending edges adapted to abut inturned edge flanges on the shield members to locate the latter in assembly in predetermined positions about the circumference of such ring shaped end member.

Still another object of the invention is directed to a simplified process for making the cup shaped end member referred to, such process being especially adapted to economical manufacture by automatic screw machines. According to such process, a metal body is bored to form an open ended cup having an annular wall with a circular rim at the open end of the cup and an integral base spaced axially from the rim. A tool is then inserted through the open end of the cup and, in a turning operation, removes metal from the inside of the annular wall from the base to a point short of the rim to form a cylindrical inside surface. Stopping the turning operation short of the rim leaves an integral inwardly projecting annular flange on the cup rim. Such flange has a circular inner periphery formed in the original boring operation. Thereafter, circumferentially spaced segmental portions of the rim are removed, leaving spaced portions of the rim flange. Such rim flange portions serve as locaters disposed between the spaced edges of the shield members when the latter are inserted into the cup through those areas of the end opening from which the segmental rim portions have been removed. The single turning operation thus provides not only cylindrically surfaced areas on the inside of the cup wall to which the complementally shaped ends of the shield members can be readily bonded, but also provides circumferentially spaced inwardly directed rim flange means that engage the edges of the shield members to locate the latter in assembly.

The invention will now be set forth in more detail and with reference to a preferred embodiment representing the best known mode of practicing the invention. Other objects and advantages will be made clear as the description proceeds. This description is made in connection with the accompanying drawings, forming a part of the specification.

In the drawings:

FIGURE 1 is a side elevational view of a sight glass gauge showing the guard assembly of the present invention, the device being mounted on an elbow used in securing the gauge to the upright wall of a coffee maker or other liquid vessel;

FIG. 2 is a fragmentary vertical sectional detail taken substantially in an axial plane represented by the line 2—2 of FIG. 1 and enlarged with respect to that figure, this view showing the internal construction of the two part upper end member;

FIG. 3 is a transverse sectional detail with parts broken away and removed taken substantially in the plane represented by the line 3—3 of FIG. 2;

FIG. 4 is a transverse sectional detail with parts broken away and with parts removed, taken substantially in the plane represented by the line 4—4 of FIG. 1 and enlarged with respect to that figure; and FIG. 5 is an axial sectional detail through the bottom end member, this view showing the internal construction as revealed by sections in intersecting planes represented by the irregular line 5—5 of FIG. 4.

The liquid level gauge of which the present guard device is a part comprises an elongated tubular sight glass 1 of uniform section extending between top and bottom end members 2, 3 and disposed between a pair of guards or shield members 4, 5 which also extend between the end members 2, 3. An externally threaded axial boss 6 projecting from bottom 7 of the cup shaped bottom end member 3 is adapted to be screwed into the upwardly directed branch of an elbow fitting 8 mounted on upright wall 10 of a vessel such as a coffee maker which contains the liquid, the level of which is to be gauged. The bottom 7 and the axial boss 6 of the end member 3 are formed with a passage 11 continuous with passages 12 in the elbow fitting 8 that communicate with the interior of the vessel through the wall 10. Thus, liquid filling the vessel 10 to a height above the bottom fitting 3 flows into the latter through the passages 11, 12 and rises in the sight glass 1 where it is visible through portions of the glass that are exposed between inturned edge flanges 14 of the shields 4, 5.

As indicated above, the bottom end member 3 is conveniently made as an automatic screw machine product thereby eliminating molds and dies and costly finishing procedures. The screw machine operations used in producing the end member will vary, but include a preliminary boring into one end of the metal stock or body to form a recess or cavity having a diameter substantially equivalent to external cylindrical surface 15 of the tubular sight glass 1. This boring operation is followed by an undercutting step in which the stock is rotated about the bore axis and a suitable tool is inserted through the end opening of the recess to engage and remove metal from the inside of the annular wall, from the bottom of the recess to a point short of the opening. Such undercutting or turning forms an inwardly directed cylindrical surface 16 on the cup wall, the turned wall surface thus formed being concentric to the circular end opening made in the preliminary boring operation. Since the removal of metal from the annular wall of the original cup is stopped short of the cup rim, the latter forms an inwardly directed circular flange. Segments of such flange are then cut away or otherwise removed, leaving circumferentially spaced portions of the flange that engage and center the glass tube in the cup and that divide the cup rim into a plurality of symmetrically disposed zones for receiving the lower ends of the shield members 4, 5. As shown in FIG. 4, the cylindrical surface 16 has a diameter greater than that of the surface 15 of the glass tube to provide arcuate spaces in the cup that accommodate the ends of the shield members 4, 5.

Each of the shield members 4, 5 is in the form of an elongated thin metal strip of uniform section from end to end and comprises a main or body portion 20, curved concentrically to the cylindrical surface 15 of the glass tube, and integral inturned angularly related edge flanges 14. Edges 21 of the flanges 14 contact the cylindrical surface 15 of the glass tube along circumferentially spaced symmetrically disposed sealing lines and hold the body portions 20 of the shield members away from the glass tube in the provision of insulating air spaces 22. In addition to minimizing heat transfer to or from liquid in the sight glass, the air spaces 22 allow slight deformation of the shield members upon impact without cracking or breaking of the glass tube 1.

The flange means on the rim of the cup which constitutes the inwardly directed projections 17, 18 provides circumferentially spaced abutments 23 that engage the inturned edges or flanges 14 of the shield members 4, 5 to locate the latter and to hold the parts together in assembly. Each of the radial rim projections 17, 18 has an arcuate inner edge 24. By reason of the fact that such edges are formed simultaneously by the preliminary boring operation mentioned, they all lie along a common circle having a diameter substantially equivalent to that of the glass tube 1. As shown to advantage in FIG. 5, the projections 17, 18 are disposed wholly beyond or above the plane defined by end or rim faces 25 of the cup shaped member.

The outer surfaces of the shield members 4, 5 have the same radius of curvature as the cylindrical internal wall surface of the end member 3 so that the lower end of each of the shield members engages the wall of the cup member over sufficient area to permit easy attachment by ordinary soldering or brazing procedures. The bonding of the shield members to the bottom end member is facilitated by a technique which involves the use of means such as a brazing strip 27. This strip is interposed between the shield and cup members in assembly and bonds to both of them when the assembly is heated in a suitable furnace to the brazing temperature appropriate to the particular brazing strip used. The strip 27 may conveniently take the form of a flat metal ribbon of uniform width bent into a split ring. This brazing ring is received in an annular groove 28 turned in the cylindrical surface 16 to a depth slightly less than the thickness of the brazing strip and of a width slightly greater than that of such strip. The position of the brazing strip is thus predetermined in relation to the shield members which are inserted into the cup after the brazing strip is located. Positive contact between the brazing strip surface and the shield members is assured by the slight protrusion of the strip 27 from the locating groove 28.

The upper end member 2 comprises an inner part in the form of a substantially cylindrical shell or ring 30 and an outer cap part 31 respectively threaded externally and internally to permit easy assembly and disassembly and to apply an axial load to the glass 1 through an intervening cushioning washer 32 disposed against the upper end of the glass tube, thereby squeezing a sealing washer 33 of rubber or other resilient deformable material interposed between floor 34 of the cup member 3 and the lower end of the glass tube 1. A central vent hole 35 is provided in the cap 31 to permit egress and ingress of air into the tube 1 as the liquid level rises and falls in the latter. The cap may be replaced by a fitting made fast to the vessel and formed with an internal passage connecting the glass interior to the interior of the vessel.

Extending axially in depending relation from the body of the inner ring member 30 and located in symmetrical circumferentially spaced relation about such ring member are integral attaching segments or legs 37, 38. These segments have cylindrically curved outside surfaces 40 formed to the same radius of curvature as the inside surfaces of the shield members 4, 5 so that the ring and the shields can be easily and strongly bonded together by conventional brazing or soldering techniques. As shown to advantage in FIG. 3, the attaching segments 37, 38 are snugly fitted between the inturned flanges 14 of the shield members. The attaching segments and the shield members are assembled into self locking, frictionally held joints by relative axial sliding movement, the attaching segments having parallel side edges engaged by and confined and guided between the inturned reversely disposed edge flanges of the shield members. The lower corners of the segmental legs 37, 38 are relieved to provide slanted edge portions 45 and narrow lower ends on such legs which facilitate entry of the latter between the shield flanges in assembly. The parts are located axially in such assembling operation by engagement of the upper ends of the inturned flanges against the body of the ring 30 or, if desired, by engagement of the ends of the body portions 20 of the shield members against circumferentially extending shoulders 39 formed on the ring 30 at the bases of the attaching segments 37, 38.

Suitable bonding of the upper ends of the shield members 4, 5 to the attaching segments of the ring part is by soldering or brazing, may employ a technique similar to that described for bonding the lower ends of the shield strips to the walls of the cup member 3. The outwardly directed surfaces 40 of the attaching segments 37, 38 are formed with shallow circumferentially extending grooves 41. These grooves receive and locate separate flat metal brazing strips the ends of which may be bent around the spaced side edges of the segments, as indicated at 43, to hold the brazing strips in place during assembly.

The brazing strips 42 as well as the brazing strip 27 previously described are conventional alloys characterized in that they melt at temperatures slightly below the melting temperature of the metal parts they unite. The sight glass guard shown is formed of aluminum components; the brazing strips 27 and 42 are brazing stock number 718 as sold by Williams and Company, Cleveland, Ohio. Desirably the grooves 28 and 41 which accommodate the brazing strips are somewhat shallower than the thickness of the respective brazing strips so that the brazing strips project slightly from the grooves insuring positive contact between the brazing strips and the surfaces of the parts to be joined.

In assembling the components of the present device, the brazing strips 27, 42 are placed in their respective grooves and the shield members 4, 5 slid into place, the cooperating locating edges, flanges and abutments described above serving to guide the parts into correct relative positions and insuring against misplacement and misalignment. The sub-assembly thus formed comprising the shield members 4, 5, carrying the bottom end member 3 and the ring member 30 of the top end member, together with the intervening brazing strips is then heated as by being fired in a suitable furnace to melt the brazing strips or at least the surfaces thereof, and is then cooled thereby to bond the parts together. A wedge or spreader placed between the shield members adjacent the bottom member 3 and a suitable clamp or constricting device placed around the shield members adjacent the ring 30 prior to and left in place during heating and cooling provide the desired pressure between the various surfaces being bonded together.

By reason of the fact that the shield members 4, 5 contact the glass tube only along the edges of the inturned flanges 14, effective edge seals are maintained, the entrance of dirt or other foreign material between the sight glass and the shields is minimized. When it is desired to clean the device, it is taken apart simply by unscrewing the cap 31 and withdrawing the glass tube 1. After cleaning, the parts are readily reassembled by reversing the procedure and the device again is ready for use.

It is thus seen that the present invention provides a sturdy and serviceable guard assembly for the sight glass tube of a liquid level gauge. The various parts of the device are easily made from readily available materials. Although aluminum is preferred when the device is to be used on a device such as a coffee maker, it is intended that other materials such as brass and copper may be used on certain applications. Furthermore, it is contemplated that when desired the top and bottom end members can be of the same construction; that is, they can both be the same as the top end member 2 or both the same as the bottom end member 3, suitable changes being made in the configuration of the parts to provide for attaching and venting. Each end member can be used with other types of shield members and end members and the shield members can be used with other types of end members.

Although the invention has been described only in connection with illustrations showing a preferred embodiment, modifications are contemplated, it being intended that the patent shall be limited only by law and shall cover all features of patentable novelty residing in the invention.

What I claim and desire to secure by Letters Patent of the United States is:

1. A sight gauge glass guard comprising end members adapted to receive the ends of a tubular gauge glass having a cylindrical outer surface, and a shield member extending between the end members to parallel and partially enclose such a gauge glass received between the end members, said shield member comprising a body portion and a longitudinally extending inturned flange portion, one of the end members comprising an outer cap and a circular inner ring part, the cap being formed with internal threads, the ring part having an attaching portion and an axially extending arcuately curved segmental portion of substantially uniform thickness disposed inside the shield member and constituting a spacer between the shield member and such a received gauge glass, said segmental portion having an axially extending edge, the flange portion of the shield extending into the cap and being disposed against said edge to thereby locate the shield in predetermined position circumferentially of the ring part, bonding means interposed between and bonded to the segmental portion of the ring part and the shield member, said bonding means being recessed in and of less axial extent than such segmental portion, and the ring part also having thread means on said attaching portion adapted to receive the threaded cap for facile removal and replacement.

2. A sight gauge glass guard comprising end members adapted to receive the ends of a tubular gauge glass having a cylindrical outer surface, and a shield member extending between the end members to parallel and partially enclose such a gauge glass received between the end members, said shield member comprising a body portion and a longitudinally extending inturned flange portion, one of the end members comprising a cup having an arcuately curved inside wall including a cylindrical portion adapted to be received against the outside surface of the shield member at one end of the latter, the flange portion of the shield extending into the cup, said cylindrical portion of the inside wall being formed with a circumferential groove, bonding means in said groove and bonded to the outside surface of the shield member and the cup, and the cup having rim flange means extending radially inwardly and formed with radial shoulder means engaged against the flange portion of such shield member to locate the latter in predetermined position against and circumferentially of said wall, the rim flange means of the cup and the flange portion of the shield member being coextensive radially and the said rim flange means constituting a filler between the inside wall of the cup and the cylindrical surface of such a received gauge glass.

3. A sight gauge glass guard comprising end members adapted to receive the ends of a tubular gauge glass having a cylindrical outer surface, and a shield member extending between the end members to parallel and partially enclose such a gauge glass received between the end members, said shield member comprising a body portion and a longitudinally extending inturned flange portion,
one of the end members comprising an outer cap and a circular inner ring part,
the cap being formed with internal threads,
the ring part having an attaching portion and an axially extending arcuately curved segmental portion of substantially uniform thickness disposed inside the shield member and constituting a spacer between the shield member and such a received gauge glass, said segmental portion having an axially extending edge, the flange portion of the shield extending into the cap and being disposed against said edge to thereby locate the shield in predetermined position circumferentially of the ring part,
bonding means interposed between and bonded to the segmental portion of the ring part and the shield member, said bonding means being recessed in and of less axial extent than such segmental portion,
the ring part also having thread means on said attaching portion adapted to receive the threaded cap for facile removal and replacement,
the other of the end members comprising a cup having an arcuately curved inside wall including a cylindrical portion adapted to be received against the outside surface of the shield member at one end of the latter, the flange portion of the shield extending into the cup,
said cylindrical portion of the inside wall being formed with a circumferential groove, bonding means in said groove and bonded to the outside surface of the shield member and the cup,
and the cup having rim flange means extending radially inwardly and formed with radial shoulder means engaged against the flange portion of such shield member to locate the latter in predetermined position against and circumferentially of said wall.

4. A guard for an elongated glass tube having a cylindrical outer surface,
said guard comprising end members adapted to receive the ends of the glass tube and a plurality of thin elongated arcuately curved shield members disposed in overlying relation to the glass tube and extending between the end members,
the shield members having side edges in spaced parallel relation, one of said end members comprising a cup having a bottom and an annular side wall, the latter including inwardly facing arcuate portions,
the shield members having their ends disposed in abutting relation against said bottom of the cup and their outside surfaces received against the arcuate wall portions of the cup,
a plurality of inwardly projecting spacing elements on the cup and extending between the spaced edges of the shielded members to space the latter in predetermined relation,
the shield members each having a body portion and a pair of narrow inturned edge flanges extending along the body portion and angularly disposed relative to the latter,
said edge flanges being adapted to engage the cylindrical surface of such glass tube to space the body portions of the shield members from such tube, and
the cup spacing elements having arcuately curved inner edges which lie on a circle having a diameter substantially equal to that of the external surface of the glass tube.

5. A guard for an elongated glass tube having a cylindrical outer surface,
said guard comprising a cup-shaped first end member adapted to receive one end of such a glass tube in sealing relation, a plurality of thin elongated arcuately curved shield members adapted to be disposed in overlying relation to such a glass tube and having ends received within the end member,
the shield members being disposed in spaced parallel relation to one another,
said end member having inside wall surface portions received against the outside surfaces of the shield member ends, the cup having a bottom wall,
means bonding the shield members to the cup member,
the shield members having their ends disposed in abutting relation against said bottom wall of the cup and axially located thereby, a plurality of inwardly projecting flanges integrally formed on the cup and extending into the space between the shield members to locate the latter in predetermined circumferentially spaced relation about the cup,
the shield members each having a body portion and a pair of narrow inturned edge flanges extending along the body portion and angularly disposed relative to the latter,
said edge flanges being adapted to engage the cylindrical surface of such a glass tube so received to space the body portions of the shield members from such tube,
the cup flanges having arcuately curved inner edges which lie on a circle having a diameter substantially equal to the diameter of the external surface of such glass tube,
a second end member comprising a circular inner ring part and an outer cap part,
the ring and cap parts having interfitting formations for facile removal and replacement of the cap,
the ring part having circumferentially extending radial shoulder means and including a plurality of axially extending arcuately curved segmental portions,
said segmental portions of the ring part each having spaced parallel side edges abutted against the inside surfaces of the shield member flanges to locate the shield members in predetermined relation circumferentially about the ring part, and
the shield members being locatingly abutted against the shoulder means of the ring part.

6. A guard for an elongated glass tube having a cylindrical outer surface,
said guard comprising end members adapted to receive the ends of the glass tube and a plurality of thin elongated shield members disposed in overlying relation to the glass tube and extending between the end members,
the shield members having side edges in spaced parallel relation, one of said end members comprising a cup having a side wall,
the shield members having their outside surfaces received against the wall of the cup,
a plurality of inwardly projecting spacing elements on the cup and extending between the spaced edges of the shield members to space the latter in predetermined relation,
the shield members each having a body portion and a pair of narrow inturned edge flanges extending along the body portion and angularly disposed relative to the latter, and
said edge flanges being adapted to engage the cylindrical surface of such glass tube to space the body portions of the shield members from such tube.

7. A guard for an elongated glass tube having a cylindrical outer surface,
said guard comprising end members adapted to receive the ends of the glass tube and a plurality of thin elongated shield members disposed in overlying relation to the glass tube and extending between the end members,
the shield members having side edges in spaced parallel relation, one of said end members comprising a cup having a side wall,
the shield members having their outside surfaces received against the wall of the cup,
a plurality of inwardly projecting spacing elements on the cup and extending between the spaced edges of the shield members to space the latter in predetermined relation, the shield members each having a body portion and a pair of narrow inturned edge flanges extending along the body portion and angularly disposed relative to the latter, said edge flanges being adapted to engage the cylindrical surface of such glass tube to space the body portions of the shield members from such tube, and the cup spacing elements having arcuately curved inner edges which lie on a circle having a diameter substantially equal to that of the external surface of the glass tube.

References Cited in the file of this patent

UNITED STATES PATENTS

| | | |
|---|---|---|
| 963,150 | Howell | July 5, 1910 |
| 1,226,618 | Britton | May 15, 1917 |

FOREIGN PATENTS

| | | |
|---|---|---|
| 7,585 | Great Britain | 1896 |